United States Patent
Inoue et al.

[11] Patent Number: 5,449,735
[45] Date of Patent: Sep. 12, 1995

[54] PROCESS FOR PRODUCING ORGANOPOLYSILOXANE WITH HIGH POLYMERIZATION DEGREE

[75] Inventors: Yoshio Inoue; Susumu Sekiguchi; Minoru Igarashi; Masaharu Takahashi, all of Annaka, Japan

[73] Assignee: Shin-Etsu Chemical Co., Ltd., Tokyo, Japan

[21] Appl. No.: 240,886

[22] Filed: May 11, 1994

[30] Foreign Application Priority Data

May 11, 1993 [JP] Japan .................................. 5-132815
Jul. 15, 1993 [JP] Japan .................................. 5-199047

[51] Int. Cl.$^6$ ............................................ C08G 77/08
[52] U.S. Cl. .................................. 528/22; 528/34; 528/38
[58] Field of Search ........................... 528/34, 38, 22

[56] References Cited

U.S. PATENT DOCUMENTS

| | | | |
|---|---|---|---|
| 4,683,251 | 7/1987 | Mikami | 522/46 |
| 4,792,596 | 12/1988 | Ottinger et al. | 528/14 |
| 5,109,094 | 4/1992 | Rees et al. | 528/14 |
| 5,173,558 | 12/1992 | Hansen | 528/14 |

OTHER PUBLICATIONS

Zeigler et al. *Silicon–Based Polymer Chemistry* 1990, pp. 84–85.

*Primary Examiner*—John C. Bleutge
*Assistant Examiner*—Margaret W. Glass
*Attorney, Agent, or Firm*—Cushman, Darby & Cushman

[57] ABSTRACT

Organopolysiloxanes having a silanol group at both terminal ends of molecular chain thereof are brought into condensation reaction with each other in the presence of a silane or siloxane having at least two dialkylaminosilyl groups per molecule as a condensation catalyst and a triorganosilanol or other endblocking agent, to lengthen the chain of the organopolysiloxane under reaction, whereby a triorganosilyl-endblocked organopolysiloxane with a high polymerization degree is obtained. The process yields a triorganosilyl-endblocked high-polymerization-degree organopolysiloxane while effectively suppressing or preventing the formation of low-molecular-weight siloxanes.

9 Claims, No Drawings

PROCESS FOR PRODUCING ORGANOPOLYSILOXANE WITH HIGH POLYMERIZATION DEGREE

BACKGROUND OF THE INVENTION

1. Field of the Invention

The present invention relates to a process for producing an organopolysiloxane with high polymerization degree, and more particularly to a process for producing an organopolysiloxane with high polymerization degree endblocked with a triorganosilyl group while preventing effectively the formation of low-molecular-weight siloxanes with low polymerization degree.

2. Description of the Prior Art

Silicone rubbers, with their excellent weatherability, electrical properties, low-compression-set properties, heat resistance, cold resistance and the like, are widely used in electronic apparatus, automobile, construction, medical, food and other diverse fields. The applications for which silicone rubbers are in use include, for example, rubber contacts for use in rubber contact keys in remote controllers, typewriters, word-processors, computer network terminals, musical instruments, etc.; gaskets for construction; diverse rolls such as copying-machine rollers, developing rollers, transfer rollers, electrification rolls, paper feed rollers, etc.; vibration-proofing rubber for audio devices, etc.; packings or gaskets for compact disks used in computer systems, and so forth.

There is an increasingly greater demand for silicone rubbers, and development of silicone rubber with excellent characteristics is desired.

Among others, reduction in the amount of low-molecular-weight siloxanes contained in a high-polymerization-degree organopolysiloxane is keenly demanded. In a contact rubber used for contact keys, for example, low-molecular siloxanes may cause contact failure. In copying-machine roll or roller materials, low-molecular siloxanes may cause the so-called "offset" phenomenon in which a toner is transferred onto the roll through the low-molecular siloxane. It is also known that in gaskets for construction use or the like, one of the major contaminants is the low-molecular siloxanes which remain in the organopolysiloxane constituting the gasket or the like.

In view of the above, various methods have been investigated for reducing the amount of low-molecular siloxanes contained in an organopolysiloxane having a high polymerization degree.

As a method of reducing the low-molecular-weight siloxane content, is known a method in which a high-polymerization-degree organopolysiloxane (which hereinafter may be referred to simply as "siloxane gum") is subjected to stripping at a high temperature of 100° to 300° C. under a reduced pressure. Because of the high viscosity of the siloxane gum, however, tremendous energy and time is needed to remove the low-molecular siloxanes assuredly. This method is thus limited in its practical use. Therefore, a method for obtaining a siloxane gum in which the amount of low-molecular siloxanes is extremely small has been requested.

A method of producing a siloxane gum is disclosed, for example, in U.S. Pat. No. 2,634,252 in which a siloxane gum is obtained through an equilibration reaction using potassium hydroxide, potassium silanolate, lithium silanolate, tetraalkylammonium hydroxide or the like as a catalyst. The siloxane gum obtained using such a catalyst is endblocked with silanol, and its terminal ends can be easily treated. According to this method, however, the resulting siloxane gum contains a considerable amount (about 5 to 10% by weight) of cyclic low-molecular siloxanes, removal of which requires huge costs.

Also, methods are known for producing a siloxane gum without formation of low-molecular-weight siloxanes. For example, a method is known in which a silanol is subjected to dehydration condensation using an acidic compound having a $pK_a$ of 3 or less at 20° C. (European Patent Publication 0431980 corresponding to Japanese Pre-examination Patent Publication (KOKAI) No. 3-179027). This method is not yet satisfactory in preventing effectively the formation of low-molecular siloxanes.

SUMMARY OF THE INVENTION

Accordingly it is an object of the present invention to provide a process for producing an organopolysiloxane with high polymerization degree useful as a compounding ingredient for ordinary silicone rubber compositions while preventing effectively the formation of low-molecular siloxanes.

The present invention provides a process for producing a triorganosilyl-end blocked organopolysiloxane with a high polymeriszation degree, comprising mixing an organopolysiloxane having a silanol group at both terminal ends of its molecular chain represented by the following general formula (1):

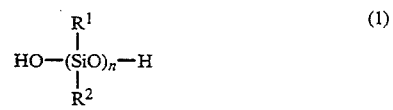

wherein $R^1$ and $R^2$ may be the same or different and are each an unsubstituted or substituted monovalent hydrocarbon group, and n is an integer of 2 to 3,000, with at least one member selected from the group consisting of silanes, siloxanes and their mixtures, said silanes and siloxanes each having at least two dialkylaminosilyl groups per molecule, in amounts such that the molar ratio of silanol groups to dialkylaminosilyl groups is from 0.5 to 3.0, and heating the resulting mixture to produce a chain-lengthened organopolysiloxane with a high polymerization degree, wherein said heating is carried out in the presence of an organosilicon compound having the following general formula (2):

wherein a is 1 or 2, $R^3$, $R^4$ and $R^5$ may be the same or different and are each an unsubstituted or substituted monovalent hydrocarbon group, and Z is a hydroxyl group, a halogen atom or $-NR^6R^7$ where a=1, and $=NX$ where a=2 (wherein $R^6$ and $R^7$ may be the same or different and are each an unsubstituted or substituted monovalent hydrocarbon group, and X is a hydrogen atom or an unsubstituted or substituted monovalent hydrocarbon group) or is followed by reacting said organosilicon compound with the chain-lengthened organopolysiloxane.

The chain-lengthened, high-polymerization-degree organopolysiloxane obtained by the present process normally contains low-molecular-weight siloxanes of the following formula (3):

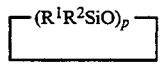  (3)

wherein $R^1$ and $R^2$ are as defined above, and p is an integer of not more than 25, in a total amount of 5,000 ppm or less. Particularly, where low-molecular siloxanes have preliminarily been removed sufficiently from the organopolysiloxane of the above general formula (1) used as the starting material, the total amount of low-molecular siloxanes in the resulting high-polymerization-degree organopolysiloxane will be 2,000 ppm or less, due to extremely effective prevention of the formation of low-molecular siloxanes.

The organosilicon compound having the above general formula (2) acts as an endblocking agent, so that the organopolysioxane finally obtained with a high polymerization degree has a molecular chain endblocked with a triorganosilyl group. Therefore, the organopolysiloxane obtained is suited to use as a compounding ingredient for ordinary silicone rubber compositions.

DETAILED DESCRIPTION OF PREFERRED EMBODIMENTS

Starting Material

In the process of the present invention, an organopolysiloxane having a silanol group at both ends of its molecular chain represented by the general formula (1) above is used as a starting material. In the general formula (1), $R^1$ and $R^2$ are each an unsubstituted or substituted monovalent hydrocarbon group, which includes, for example, alkyl groups such as methyl, ethyl, propyl and the like; alkenyl groups such as vinyl, allyl and the like; cycloalkyl groups such as cyclohexyl and the like; aryl groups such as phenyl, tolyl and the like; aralkyl groups such as benzyl, phenylethyl and the like; and groups derived from these groups by substitution of a part or all of the hydrogen atoms by a halogen atom, cyano group, etc., for example, chloromethyl, trifluoropropyl, cyanoethyl, α-cyanophenylethyl and so forth, and preferably includes methyl, vinyl, phenyl and trifluoropropyl.

In the general formula (1), n is an integer representing the polymerization degree, and normally ranges from 2 to 3,000, a preferable range from an economic point of view being from 10 to 1,000.

Among the above organopolysiloxanes, in the present invention, those from which cyclosiloxanes not taking part in polymerization have been removed as much as possible by stripping or the like are preferably used, in order to reduce the amount of low-molecular siloxanes which might be left contained in the desired high-polymerization-degree organopolysiloxane. Of the starting organopolysiloxanes usable, most preferred are those obtained by ring-opening polymerization of cyclotrisiloxanes.

Chain-Lengthening

According to the present invention, as a reaction catalyst for polycondensing the starting organopolysiloxane with the result of chain-lengthening, at least one member selected from the group consisting of silanes, siloxanes and their mixtures, said silanes and siloxanes each having at least two dialkylaminosilyl groups per molecule, is used. Such silanes and siloxanes include, for example, the compounds which have the following general formula (4):

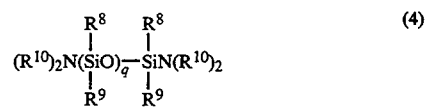

wherein $R^8$ and $R^9$ is an unsubstituted or substituted monovalent hydrocarbon group, $R^{10}$ is an alkyl group, and q is an integer of 0 to 1,000.

In the general formula (4), the unsubstituted or substituted monovalent hydrocarbon groups $R^8$ and $R^9$ includes, for example, those groups which have been mentioned above as exemplars of the $R^1$ and $R^2$ in the general formula (1). Among these, particularly preferred for use as $R^8$ are alkyl groups such as methyl, etc., and vinyl, trifluoropropyl and phenyl groups, whereas particularly preferred for use as $R^9$ are alkyl groups such as methyl. Preferred $R^{10}$ groups are alkyl groups having not more than 4 carbon atoms.

Although q may be an integer of 0 to 1,000, it preferably ranges from 1 to 100, because the catalytic activity of the reaction catalyst is normally higher as the value of the integer q is lower.

Specific examples of the catalyst include the following:

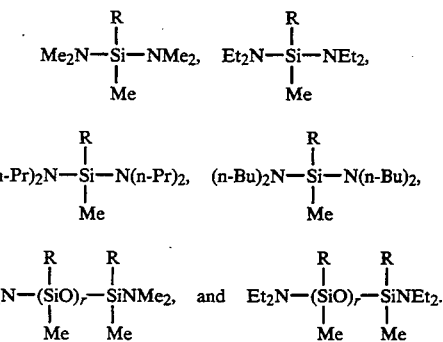

wherein in the formulas above, R is an alkyl, vinyl, trifluoropropyl or phenyl group, Me stands for the methyl group, Et stands for the ethyl group, Pr stands for the propyl group, Bu stands for the butyl group, and r is an integer of 1 to 100.

The organopolysiloxane as the starting material and the silane, siloxane or their mixture as the catalyst are used in amounts such that the molar ratio of silanol groups to dialkylamino groups ranges from 0.5 to 3.0, preferably from 0.8 to 1.5. The reaction is normally carried out at a temperature of 25° to 200° C. for a period of time which may range from a few hours to a few days. Where the silane or siloxane or their mixture used as the catalyst is volatile, condensation may be performed to a certain extent at room temperature before heating to a temperature of 150° to 180° C. to continue reaction, whereby a high molecular weight organopolysiloxane with an intended molecular weight can be obtained speedily.

The high molecular weight organopolysiloxane obtained in this manner contains low-molecular siloxanes, for example, those having a polymerization degree of not more than 25 in a small amount of 5,000 ppm or less. Particularly where the amount of low-molecular siloxanes contained in the starting organopolysiloxane is very small, a polycondensed organopolysiloxane with a low-molecular-weight siloxane content of 2,000 ppm or less can be obtained. This advantage is to be noted particularly in production of organopolysiloxanes with a polymerization degree of 3,000 or more, because it is difficult to remove low molecular siloxanes from such high molecular weight organopolysiloxanes.

Endblocking Agent

According to the present invention, an organosilicon compound having the above general formula (2) is used as an endblocking agent. Namely, the chain-lengthening reaction is either carried out in the presence of the endblocking agent or is followed by reacting the chain-lengthened organopolysiloxane with the endblocking agent, whereby a triorganosilyl-endblocked siloxane gum with high polymerization degree can be obtained. The siloxane gum obtained through chain-lengthening has been terminated with an alkylamino group-containing silyl group, so that the endblocking agent reacts rapidly with the chain-lengthened siloxane gum to add a triorganosilyl group onto the molecular ends of the siloxane gum.

In the general formula (2) above, the monovalent hydrocarbon groups $R^3$ to $R^5$ include, for example, those mentioned above as exemplars of $R^1$ in the general formula (1). As X, preferred are hydrogen atom, lower alkyl groups of not more than 5 carbon atoms, and cycloalkyl groups. Typical examples of the organosilicon compound include the following:

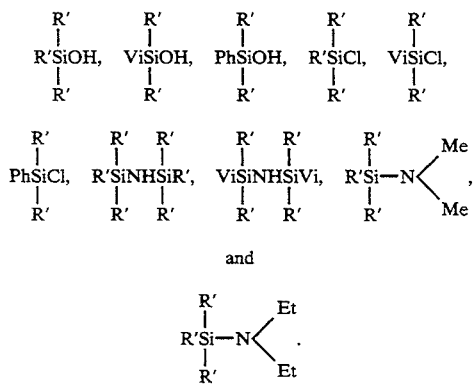

and wherein in the formulas above, R' is a lower alkyl group having not more than 5 carbon atoms such as methyl, ethyl, propyl and the like, Vi stands for the vinyl group, Ph stands for the phenyl group, Me stand for the methyl group, and Et stands for the ethyl group.

Where the chain-lengthening reaction is carried out in the presence of the endblocking agent, chain-lengthening and endblocking take place concurrently. Where endblocking is to be carried out after the chain-lengthening reaction is finished, the endblocking agent may simply be added to the chain-lengthening reaction mixture.

The endblocking reaction in the case where an organosilicon compound of the above general formula (2) with Z being hydroxyl is used as the endblocking agent, for instance, is represented by the reaction formula below, in which the organic groups and the like bonded to silicon atoms are all represented by R for convenience's sake.

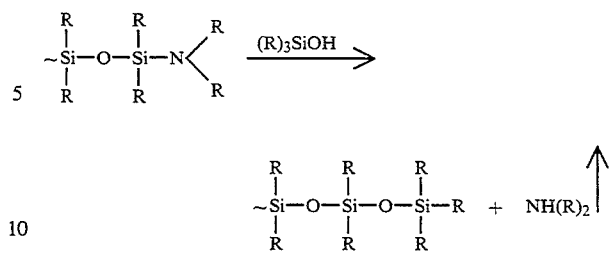

Where endblocking is carried out after completion of the chain-lengthening, the endblocking agent may be mixed into the reaction mixture by use of a mixing machine such as kneaders, planetary mixers and the like. The mixing may be satisfactorily effected at normal temperature; in the case the endblocking agent has a low reactivity, however, the mixing may be carried out by heating to a temperature close to the decomposition temperature of the organosilicon compound used as the endblocking agent. Mixing time is normally about 0.5 to 3 hours, typically about 0.5 to 1 hours.

According to the present invention, the endblocking agent may be normally used in an amount of 0.001 to 5 parts by weight per 100 parts by weight of the starting organopolysiloxane. Particularly where endblocking is performed concurrently with chain-lengthening, the amount of the endblocking agent is preferably 0.001 to 3 parts by weight, more preferably 0.05 to 0.5 part by weight. Where endblocking is performed after chain-lengthening, on the other hand, the amount of the endblocking agent is preferably 0.01 to 5 parts by weight, more preferably 0.05 to 3 parts by weight. If the amount of the endblocking agent is too small, effective endblocking is difficult to achieve, whereas use of too large an amount of the agent may cause formation of low-molecular siloxanes.

After the chain-lengthening and endblocking are completed, excess organosilicon compound is stripped by heating, whereby a triorganosilyl-endblocked siloxane gum can be obtained.

The siloxane gum contains low-molecular siloxanes with a polymerization degree of 25 or less in an extremely tiny amount. Therefore, the siloxane gum is suited to diverse applications where the presence of such low-molecular siloxanes should be avoided.

EXAMPLES

The present invention will now be described more in detail below with reference to Examples and Comparative Examples. In the following examples, D indicates polymerization degree; for instance, D3 means that polymerization degree is 3.

EXAMPLE 1

A dimethylpolysiloxane gum with a low-molecular siloxane (D3–D25) content of 530 ppm and an average polymerization degree of $7.5 \times 10^3$ was prepared, by mixing and heating bis(dimethylamino)dimethylsilane and a dialkylsiloxane having a silanol group at both ends. A kneader was charged with 500 g of the dimethylpolysiloxane gum and 5 g of trimethylsilanol, which were mixed with each other at room temperature for 2 hours, and the resulting mixture was stripped by heating at 180° C. for 2 hours, to yield an endblocked siloxane gum. The endblocked siloxane gum thus obtained was subjected to measurement of endblocking rate and low-molecular siloxane content, the results being given in Table 1.

The endblocking rate was determined by titrating the residual silanol and alkylamino groups.

EXAMPLE 2

A dimethylpolysiloxane gum with a low-molecular siloxane (D3–D25) content of 3,440 ppm and an average polymerization degree of $6.9 \times 10^3$ was prepared, by mixing and heating bis(diethylamino)dimethylsilane and a dialkylsiloxane having a silanol group at both ends. A kneader was charged with 500 g of the dimethylpolysiloxane gum and 5 g of trimethylchlorosilane, which were mixed with each other at room temperature for 2 hours, and the resulting mixture was stripped by heating at 180° C. for 2 hours, to yield an endblocked siloxane gum. The endblocked siloxane gum thus obtained was subjected to measurement of endblocking rate and low-molecular siloxane content, the results being given in Table 1.

EXAMPLE 3

A dimethylpolysiloxane gum with a low-molecular siloxane (D3–D25) content of 1,240 ppm and an average polymerization degree of $8.4 \times 10^3$ was prepared, by mixing and heating bis(diethylamino)vinylmethylsilane and a dialkylsiloxane having a silanol group at both ends. A kneader was charged with 500 g of the dimethylpolysiloxane gum and 5 g of dimethylvinylsilanol, which were mixed with each other for 2 hours, and the resulting mixture was stripped by heating at 180° C. for 2 hours, to yield an endblocked siloxane. The endblocked siloxane gum thus obtained was subjected to measurement of endblocking rate and low-molecular siloxane content, the results being given in Table 1.

EXAMPLE 4

A dimethylpolysiloxane gum with a low-molecular siloxane (D3–D25) content of 530 ppm and an average polymerization degree of $7.5 \times 10^3$ was prepared, by mixing and heating bis(dimethylamino)dimethylsilane and a dialkylsiloxane having a silanol group at both ends. A kneader was charged with 500 g of the dimethylpolysiloxane gum and 5 g of hexamethyldisilazane, which were mixed with each other for 2 hours, and the resulting mixture was stripped by heating at 180° C. for 2 hours, to yield a dimethylpolysiloxane gum. The endblocked siloxane gum thus obtained was subjected to measurement of endblocking rate and low-molecular siloxane content, the results being given in Table 1.

TABLE 1

|  | Example 1 | Example 2 | Example 3 | Example 4 |
|---|---|---|---|---|
| Average polymerization degree of siloxane gum | $7.5 \times 10^3$ | $6.9 \times 10^3$ | $8.4 \times 10^3$ | $7.5 \times 10^3$ |
| Content of D3-D25 in siloxane gum | 530 ppm | 3440 ppm | 1240 ppm | 530 ppm |
| Endblocking agent | Me$_3$SiOH | Me$_3$SiCl | ViMe$_2$SiOH | NH(SiMe$_3$)$_2$ |
| Polymerization degree of endblocked siloxane gum | $7.5 \times 10^3$ | $6.9 \times 10^3$ | $8.4 \times 10^3$ | $6.8 \times 10^3$ |
| Content of D3-D25 in endblocked siloxane gum | 534 ppm | 3451 ppm | 1128 ppm | 554 ppm |
| Endblocking rate | 78% | 86% | 85% | 80% |

COMPARATIVE EXAMPLE 1

A dimethylpolysiloxane gum with a low-molecular siloxane (D3–D25) content of 1,530 ppm and an average polymerization degree of $7.5 \times 10^3$ was prepared, by mixing and heating bis(dimethylamino)dimethylsilane and a dialkylsiloxane having a silanol group at both ends. A kneader was charged with 500 g of the dimethylpolysiloxane gum and 5 g of 1N hydrochloric acid, which were mixed with each other for 2 hours, and the resulting mixture was stripped by heating at 180° C. for 2 hours, to yield an endblocked dimethylpolysiloxane gum. The endblocked dimethylpolysiloxane gum thus obtained was subjected to measurement of endblocking rate and low-molecular siloxane content, the results being given in Table 2.

COMPARATIVE EXAMPLE

Octamethylcyclotetrasiloxane, 500 g, was heated to 170° C., to which were added 0.15 g of an endblocking agent having the following formula:

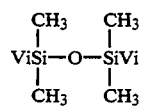

and 0.01 g of a 10% paste of potassium hydroxide and dimethylsiloxane gum (10% potassium siliconate), and polymerization was performed for 2 hours. After the reaction, temperature was lowered to 100° C. and 0.4 g of epichlorohydrin was added thereto for neutralization, to give a siloxane gum having an average polymerization degree of $7 \times 10^3$ and a low-molecular siloxane (D3–D25) content of 35,000 ppm.

The reaction product was then stripped at 180° C. for 2 hours using a kneader, to give a dimethylpolysiloxane gum. The dimethylpolysiloxane gum thus obtained was measured for endblocking rate and low-molecular siloxane content, the results being given in Table 2.

TABLE 2

|  | Comparative Example 1 | Comparative Example 2 |
|---|---|---|
| Average polymerization degree of siloxane gum | $7.5 \times 10^3$ | $7.0 \times 10^3$ |
| Content of D3-D25 in siloxane gum | 1530 ppm | 35,000 ppm |
| Endblocking agent | 1N HCl | ViSi(CH$_3$)$_2$—O—Si(CH$_3$)$_2$Vi |
| Polymerization degree of endblocked siloxane gum | $7.4 \times 10^3$ | $7.0 \times 10^3$ |
| Content of D3-D25 in endblocked siloxane gum | 5768 ppm | 20,500 ppm |
| Endblocking rate | 51% | 79% |

EXAMPLES 5 TO 7

A dimethylpolysiloxane having a silanol group at both ends (silanol group content: 0.0195 mol/500 g, low-molecular siloxane (D3–D25) content: 654 ppm) in an amount of 500 g was mixed and stirred with 0.6 g, 1.0 g and 1.2 g, respectively, of trimethylsilanol at room temperature for 30 minutes. To the resulting mixture, 1.42 g of bis(dimethylamino)dimethylsilane (dimethylamino group content: 0.0195 mol) was added, followed by stirring for 30 minutes. Then, temperature was raised to 150° C., and polycondensation was performed with stirring for 2 hours. Subsequently, the reaction product was stripped by heating at 180° C. for 2 hours, to yield an endblocked siloxane gum.

The endblocked siloxane gum thus obtained was measured for polymerization degree, endblocking rate and low-molecular siloxane (D3–D25) content, the results being given in Table 3.

TABLE 3

| | Example 5 | Example 6 | Example 7 |
| --- | --- | --- | --- |
| Average polymerization degree of starting siloxane | $7.0 \times 10^2$ | $7.0 \times 10^2$ | $7.0 \times 10^2$ |
| Content of D3-D25 in starting siloxane | 654 ppm | 654 ppm | 654 ppm |
| Endblocking agent | Me₃SiOH | Me₃SiOH | Me₃SiOH |
| Addition amount of endblocking agent | 0.8 g | 1.0 g | 1.2 g |
| Polymerization degree of endblocked siloxane gum | $6.8 \times 10^3$ | $5.2 \times 10^3$ | $4.4 \times 10^3$ |
| Content of D3-D25 in endblocked siloxane gum | 658 ppm | 662 ppm | 655 ppm |
| Endblocking rate | 78% | 76% | 75% |

EXAMPLES 8 TO 10

A dimethylpolysiloxane having a silanol group at both ends (silanol group content: 0.0190 mol/500 g, low-molecular siloxane (D3–D25) content: 329 ppm) in an amount of 500 g was mixed and stirred with 0.4 g, 0.6 g and 0.8 g, respectively, of diethylaminotrimethylsilane at room temperature for 30 minutes. To the resulting mixture, 1.36 g of bis(diethylamino)vinylmethylsilane (having a diethylamino group content of 0.0190 mol) was added. Thereafter, polycondensation was carried out in the same manner as in Example 5, to give an endblocked siloxane gum.

The endblocked siloxane gum thus obtained was measured for polymerization degree, endblocking rate and low-molecular siloxane (D3–D25) content, the results being given in Table 4.

TABLE 4

| | Example 8 | Example 9 | Example 10 |
| --- | --- | --- | --- |
| Average polymerization degree of starting siloxane | $7.5 \times 10^2$ | $7.5 \times 10^2$ | $7.5 \times 10^2$ |
| Content of D3-D25 in starting siloxane | 329 ppm | 329 ppm | 329 ppm |
| Endblocking agent | Me₃SiNEt₂ | Me₃SiNEt₂ | Me₃SiNEt₂ |
| Addition amount of endblocking agent | 0.4 g | 0.6 g | 0.8 g |
| Polymerization degree of endblocked siloxane gum | $6.2 \times 10^3$ | $5.5 \times 10^3$ | $4.7 \times 10^3$ |
| Content of D3-D25 in endblocked siloxane gum | 330 ppm | 326 ppm | 331 ppm |
| Endblocking rate | 80% | 78% | 75% |

COMPARATIVE EXAMPLE 3

A kneader was charged with 500 g of a dimethylpolysiloxane having a silanol group at both ends (silanol group content: 0.0195 mol, low-molecular siloxane (D3–D25) content: 654 ppm) and 1.42 g of bis(dimethylamino)dimethylsilane (having a dimethylamino group content of 0.0195 mol), followed by mixing and stirring at room temperature for 1 hour. Then, temperature was raised to 150° C., and polycondensation was carried out with stirring for 2 hours. Thereafter, the reaction product was stripped by heating at 180° C. for 2 hours, to give a dimethylsiloxane gum.

The dimethylsiloxane gum thus obtained was measured for polymerization degree, endblocking rate and low-molecular siloxane (D3–D25) content, the results being given in Table 5.

TABLE 5

| | Comparative Example 3 |
| --- | --- |
| Average polymerization degree of starting siloxane | $7.5 \times 10^2$ |
| Content of D3-D25 in starting siloxane | 654 ppm |
| Endblocking agent | none |
| Addition amount of endblocking agent | — |
| Polymerization degree of endblocked siloxane gum | $9.4 \times 10^3$ |
| Content of D3-D25 in endblocked siloxane gum | 658 ppm |
| Endblocking rate | 0% |

What is claimed is:

1. A process for producing a triorganosilyl-end blocked organopolysiloxane with a high polymerization degree of 3,000 or more, comprising mixing an organopolysiloxane having a silanol group at both terminal ends of its molecular chain represented by the following general formula (1):

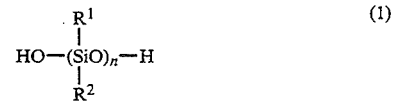

wherein $R^1$ and $R^2$ are the same or different and are each an unsubstituted or halogen atom or cyano group substituted monovalent hydrocarbon group, and n is an integer of 2 to 3,000, with a compound that functions as both the reaction catalyst and chain lengthener and is at least one member selected from the group consisting of silanes, siloxanes and their mixtures, said silanes and siloxanes each having at least two dialkylaminosilyl groups per molecule, in amounts such that the molar ratio of silanol groups to dialkylaminosilyl groups is from 0.5 to 3.0, and heating the resulting mixture to produce a chain-lengthened organopolysiloxane with a high polymerization degree, wherein said heating is carried out in the presence of an organosilicon compound having the following general formula (2):

wherein a is 1 or 2, $R^3$, $R^4$ and $R^5$ are the same or different and are each an unsubstituted or halogen atom or cyano group substituted monovalent hydrocarbon group, and Z is a hydroxyl group, a halogen atom or $-NR^6R^7$ where a=1, and =NX where a=2 wherein $R^6$ and $R^7$ are the same or different and are each an unsubstituted or halogen atom or cyano group substituted monovalent hydrocarbon group, and X is a hydrogen atom or an unsubstituted or halogen atom or cyano group substituted monovalent hydrocarbon group or is followed by reacting said organosilicon compound with the chain-lengthened organopolysiloxane, said dialkylaminosilyl-containing silane or siloxane comprising a compound having the following general formula (4):

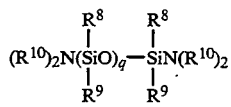
(4)

wherein $R^8$ and $R^9$ are each an unsubstituted or halogen atom or cyano group substituted monovalent hydrocarbon group, $R^{10}$ is an alkyl group, and q is an integer of 0 to 1,000.

2. The process of claim 1, wherein $R^1$ and $R^2$ in said general formula (1) are selected from the group consisting of alkyl, alkenyl, cycloalkyl, aryl and aralkyl groups whose hydrogen atoms are optionally substituted in part or wholly with halogen atoms or cyano groups, and n is an integer of 10 to 1,000.

3. The process of claim 1, wherein said dialkylaminosilyl-containing compound comprises:

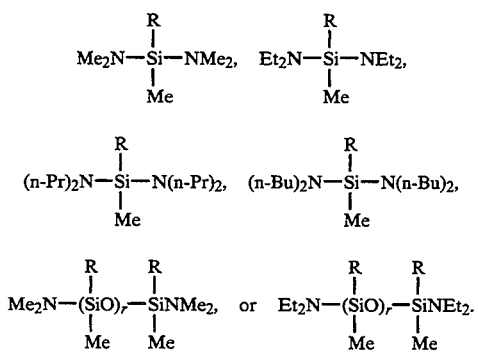

wherein in the formulas above, R is an alkyl, vinyl, trifluoropropyl or phenyl group, Me stands for the methyl group, Et stands for the ethyl group, Pr stands for a propyl group, Bu stands for a butyl group, and r is an integer of 1 to 100.

4. The process of claim 1, wherein said organosilicon compound having said general formula (2) is selected from the group consisting of:

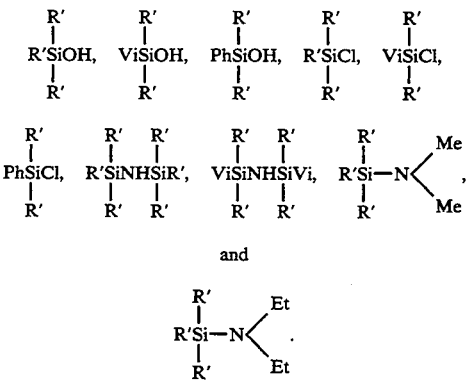

and

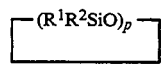

wherein in the formulas above, R' is a lower alkyl group having not more than 5 carbon atoms, Vi stands for the vinyl group, Ph stands for the phenyl group, Me stands for the methyl group, and Et stands for the ethyl group.

5. The process of claim 1, wherein said organosilicon compound of said general formula (2) is present in an amount of 0.001 to 5 parts by weight per 100 parts by weight of said organopolysiloxane of said general formula (i).

6. The process of claim 5, wherein said heating is carried out in the presence of said organosilicon compound, and said compound is present in an amount of 0.001 to 3 parts by weight per 100 parts by weight of said organopolysiloxane of said general formula (1).

7. The process of claim 5, wherein said heating is followed by a reaction of said organosilicon compound with said chain-lengthened organopolysiloxane, the amount of said organosilicon compound being 0.01 to 5 parts by weight per 100 parts by weight of said organopolysiloxane of said general formula (1).

8. The process of claim 1, wherein said triorganosilyl-endblocked organopolysiloxane with a high polymerization degree contains not more than 5,000 ppm of low-molecular-weight siloxanes having the following general formula (3):

$$\overline{[(R^1R^2SiO)_p]} \quad (3)$$

wherein $R^1$ and $R^2$ are as defined above, and p is an integer of not more than 25.

9. The process of claim 8, wherein the content of said low-molecular-weight siloxanes is 2,000 ppm or less.

* * * * *